US007421246B2

(12) United States Patent
Layley et al.

(10) Patent No.: US 7,421,246 B2
(45) Date of Patent: Sep. 2, 2008

(54) WIRELESS COMMUNICATION DEVICE AND A METHOD FOR CONTROLLING THE SAME

(75) Inventors: Martin Richard Layley, Crookham (GB); Trevor John Beer, Purley (GB)

(73) Assignee: Samsung Electronics Co., Ltd. (KR)

( * ) Notice: Subject to any disclaimer, the term of this patent is extended or adjusted under 35 U.S.C. 154(b) by 16 days.

(21) Appl. No.: 10/663,035

(22) Filed: Sep. 15, 2003

(65) Prior Publication Data

US 2004/0058648 A1  Mar. 25, 2004

(30) Foreign Application Priority Data

Sep. 16, 2002  (GB) ................. 0221457.5

(51) Int. Cl.
  *H04B 7/00*  (2006.01)
(52) U.S. Cl. .................. 455/41.2; 455/418; 455/420; 455/456.1; 455/552.1; 455/553.1; 455/90.1; 348/14.02; 348/14.04; 348/207.2; 348/211.1; 348/211.2; 379/55.1
(58) Field of Classification Search ............ 455/41.1–2, 455/418–421, 456.1–2, 517–519, 552.1, 455/553.1, 556.1–557, 90.1–2, 88, 3.01–3.06; 358/1.1, 1.13–15, 402, 405, 425, 508; 348/14.01–14.04, 348/14.11–12, 61, 94, 158, 207.1–2, 211.1–3; 379/55.1, 56.1–3
See application file for complete search history.

(56) References Cited

U.S. PATENT DOCUMENTS

| 5,881,366 | A | * | 3/1999 | Bodenmann et al. | ........ 455/41.2 |
| 6,745,253 | B2 | * | 6/2004 | Struble | ........................ 710/10 |
| 6,792,247 | B2 | * | 9/2004 | Law et al. | .................. 455/41.2 |
| 2002/0037745 | A1 | * | 3/2002 | Yahiro | ........................ 455/557 |

FOREIGN PATENT DOCUMENTS

| CN | 1 364 257 |   | 8/2002 |
| JP | 2002202836 | * | 7/2002 |
| WO | WO 01/42894 |   | 6/2001 |
| WO | WO 01/50713 | * | 7/2001 |

OTHER PUBLICATIONS

David B. Johnson, "Routing in Ad Hoc Networks of Mobile Hosts", 1995 IEEE, pp. 158-163.
Chai-Keong Toh, A Novel Distributed Routing Protocol to Support Ad-Hoc Mobile Computing, 1996 IEEE, pp. 480-486.

* cited by examiner

*Primary Examiner*—Tuan A Tran
(74) *Attorney, Agent, or Firm*—The Farrell Law Firm, PC (57) ABSTRACT

A wireless communication device comprising a search apparatus and a detection apparatus, wherein the search apparatus searches for a peripheral device when the detection apparatus detects that the peripheral device is likely to be utilized by the wireless communication device.

19 Claims, 6 Drawing Sheets

WIRELESS COMMUNICATION DEVICE AND A METHOD FOR CONTROLLING THE SAME

PRIORITY

This application claims priority to an application entitled "A Wireless Communication Device and a Method for Controlling the Same", filed in the United Kingdom Patent Office on Sep. 16, 2002 and assigned Serial No. 0221457.5, the contents of which are incorporated herein by reference.

BACKGROUND OF THE INVENTION

1. Field of the Invention

The present invention relates to a wireless communication device and a method for controlling the same, and in particular to a wireless communication device and a method for controlling the same in order to potentially utilize a peripheral device.

2. Description of the Related Art

A large number of wireless communication devices are available for consumers, for example, mobile telephones, personal digital assistants (PDAs), digital cameras, keyboards, computer mice, security devices and the like. Even car keys and household appliances may be equipped with wireless communication devices able to communicate with other devices. In each of these devices, there is a requirement to set up communication channels to transfer data between such devices and peripheral devices, e.g. printers, backup devices, data sources and data targets.

For example, a mobile telephone receives incoming text messages via the Short Message Service (SMS) of Global System for Mobile Communication (GSM). The user may wish to print such messages to keep a permanent record.

Data held on wireless communication devices may be in forms other than SMS messages, for example, calendar entries, emails, data files or streams of communication data. SMS messages, calendar entries and emails may require a printing device to provide hard copies of the data, whereas it may also be a requirement to initiate a backup of data in which case disk drives and associated backup devices will be required as the peripheral device. Also, it may merely be a requirement that the device can communicate with a separate peripheral device, for example car keys and household appliances to communicate with a car's security system and timing devices, respectively.

Any data transfer between a wireless communication device and a peripheral device will involve establishing a communications link between the two devices, as discussed in PCT application WO 01/50713. Communication links using Bluetooth or Infrared, such as those created by IRDA (Infrared Data Association), are used to link mobile phones to printers. This allows a text message to be printed on a printer within the range of the mobile phone.

Many wireless systems today allow users to use local wireless networks to share peripheral devices connected to the network, for example using Bluetooth technology.

Due to the flexibility of local wireless networks and the fluidity of devices entering and leaving the network, routes can become unstable. Due to this fluidity, it is a requirement that systems must determined what devices are attached to the network, and determine what the route is through the network to these devices, at periodic intervals.

One known method of locating peripheral devices on a local wireless network is to constantly search for the peripheral device. However, this is disadvantageous due to the use of a great deal of battery power within the wireless communication device, since constant IR or radio broadcasts and receptions are required, and hence would not be acceptable for a mobile phone where battery life is at a premium.

Another method is to locate a peripheral device required by the user of the wireless communication device at the time the operation involving that device (i.e. printing) is instructed by the user. However, to run through all the steps of detecting an available peripheral device before being able to utilize that device can take a long time. For example, it may take several minutes to initiate communications, or to receive a message informing the user that the required peripheral device is not available. The precise time taken depends on the complexity of the network. The user would thus have a wait for an undeterminable amount of time, at the end of which he may be told that the operation cannot be performed because the required device is not connected to any network within range.

The present invention therefore intends to overcome or at least alleviate some or all of the aforementioned problems.

SUMMARY OF THE INVENTION

According to a first aspect of the present invention, there is provided a wireless communication device comprising a search means and a detection means, wherein the search means searches for a peripheral device when the detection means detects that the peripheral device is likely to be utilized by the wireless communication device.

According to a second aspect of the present invention, there is provided a method of controlling a wireless communication device, including the step of searching for a peripheral device upon detection that the peripheral device is likely to be utilized by the wireless communication device.

It is necessary to conserve the battery power of wireless communication devices due to their limited capacity. The present invention finds a fine balance between using battery power constantly in order to locate peripheral devices that are available for use, and waiting a long time for a connection to a peripheral device to be made at the time when the user requests the peripheral device to be utilized.

BRIEF DESCRIPTION OF THE DRAWINGS

Specific embodiments of the present invention will now be described by way of example, with reference to the accompanying drawings, in which.

DESCRIPTION OF THE INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Figure 1:
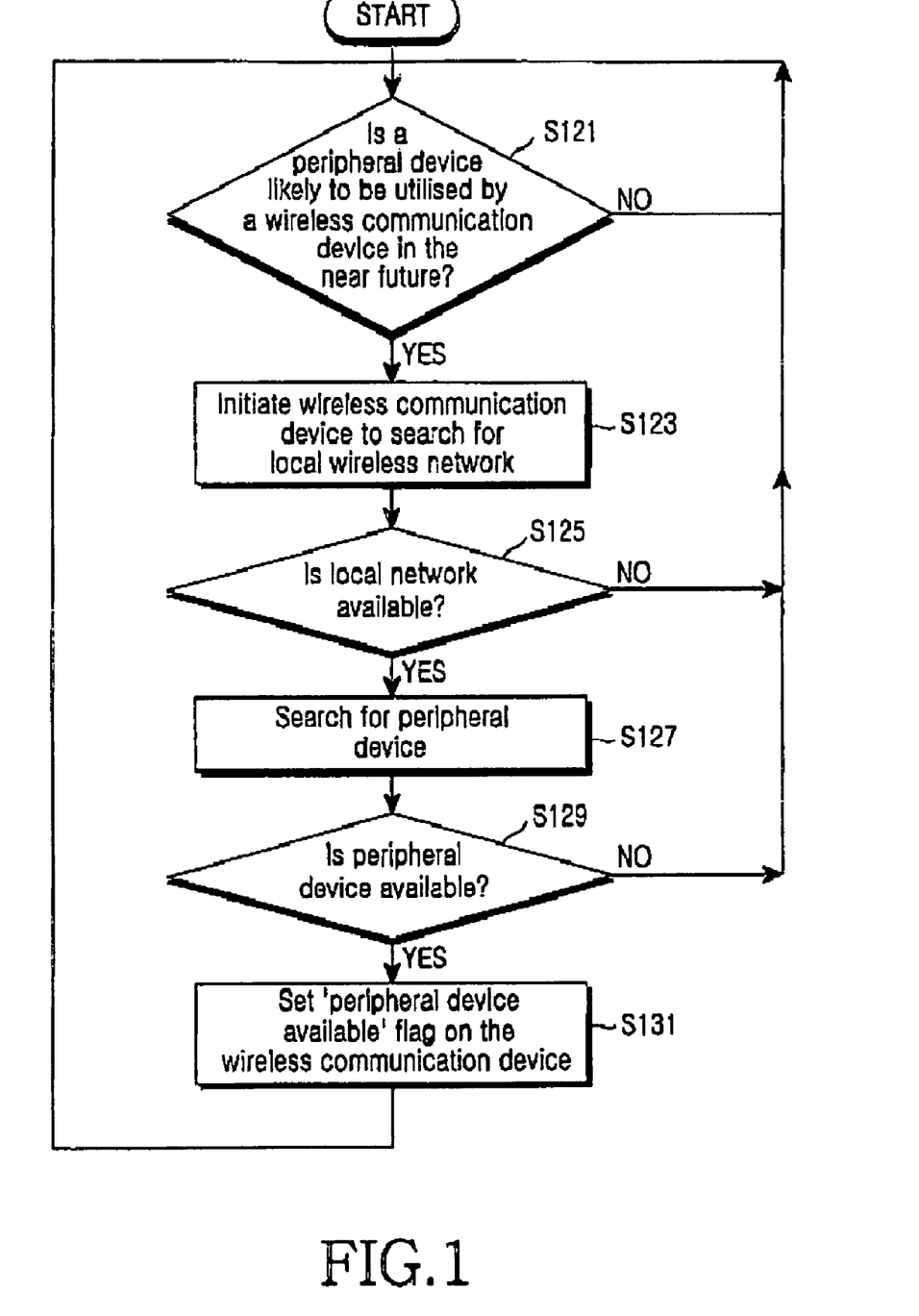
FIG. 1 is a flow chart according to an embodiment of the present invention.

FIG. 1 is a flow chart for a method of controlling a wireless communication device according to an embodiment of the present invention. In step S121 of FIG. 1, it is determined whether a peripheral device may be utilized in the near future by a wireless communication device. For example, reception of a new SMS message by a mobile telephone may mean that the mobile telephone (the wireless communication device) may utilize a printer (the peripheral device) in the near future to print the SMS message.

If a peripheral device may be required, a search is carried out for a local wireless network, as shown in step S123. If a local wireless network is available at step S125, a search for a peripheral device on the network is carried out in step S127, otherwise the process returns to step S121. If a peripheral device is available in step S129, a "peripheral device available" flag is set, as shown in step S131.

Figure 5:
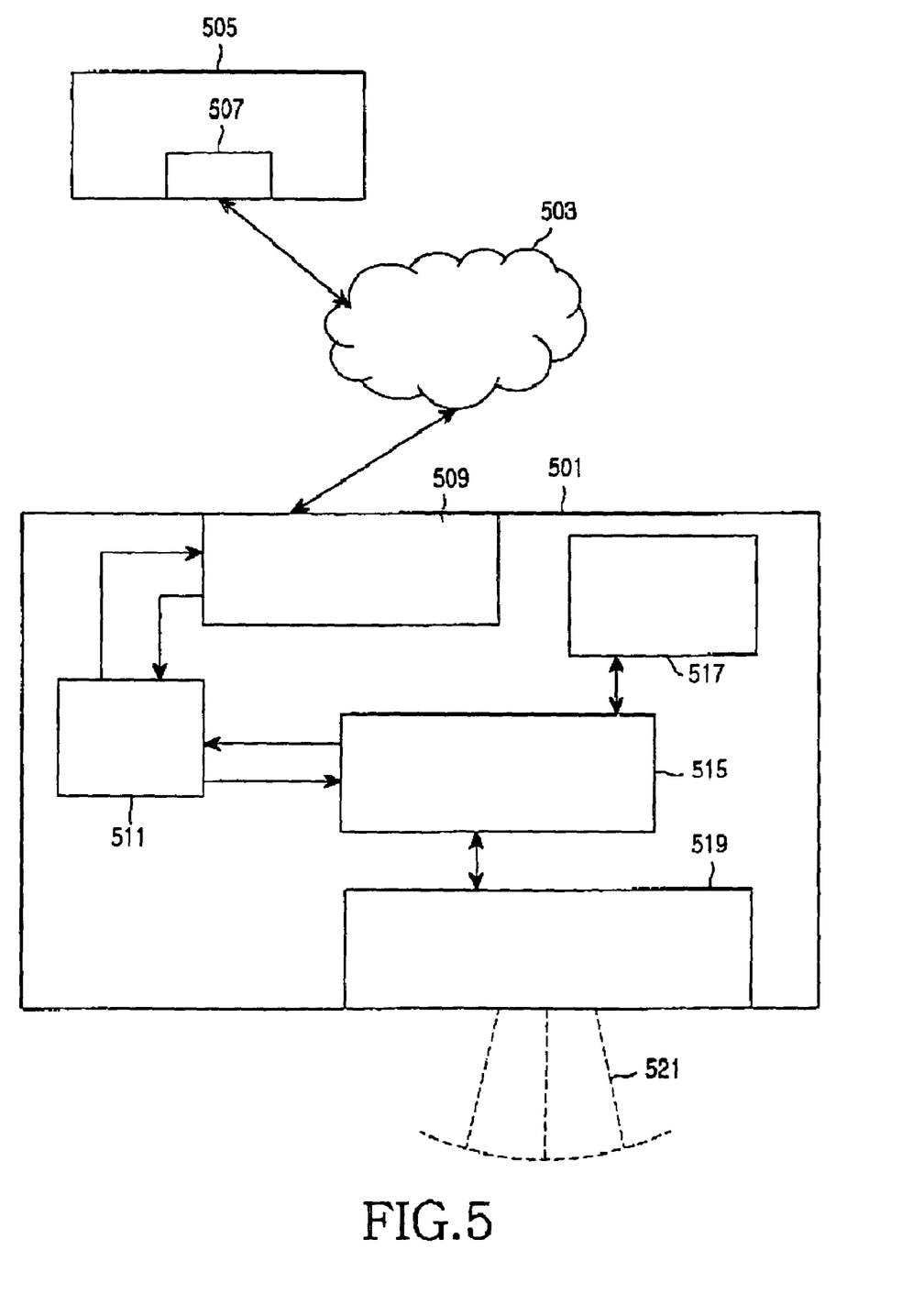
FIG. 5 is a block diagram illustrating a mobile telephone connection diagram according to an embodiment of the present invention.

More specifically, FIG. 5 is a block diagram illustrating a system incorporating a mobile telephone device capable of receiving SMS messages.

A service provider 505 has a transceiver 507 that is capable of transmitting SMS messages (e.g. a Base Transceiver Station (BTS) carrying messages from a Short Message Centre (SMSC) in a GSM network) via an air interface 503 to a mobile telephone 501. The mobile telephone 501 has a main transceiver 509, which is capable of transmitting and receiving SMS messages to and from the service provider 507 using the mobile telephone network. The incoming SMS message may be received and stored by a Subscriber Identity Module (SIM) card 511 that is housed within the mobile telephone 501 along with a controller 515, memory 517, and an auxiliary transceiver 519 for communications on a local wireless network e.g. a Bluetooth ad-hoc network.

Upon reception of a new SMS message by the mobile telephone, the auxiliary transceiver 519 of the mobile telephone determines whether a local wireless network is within range to enable the mobile telephone to communicate with the network and determine if a printer is available.

Figure 2:
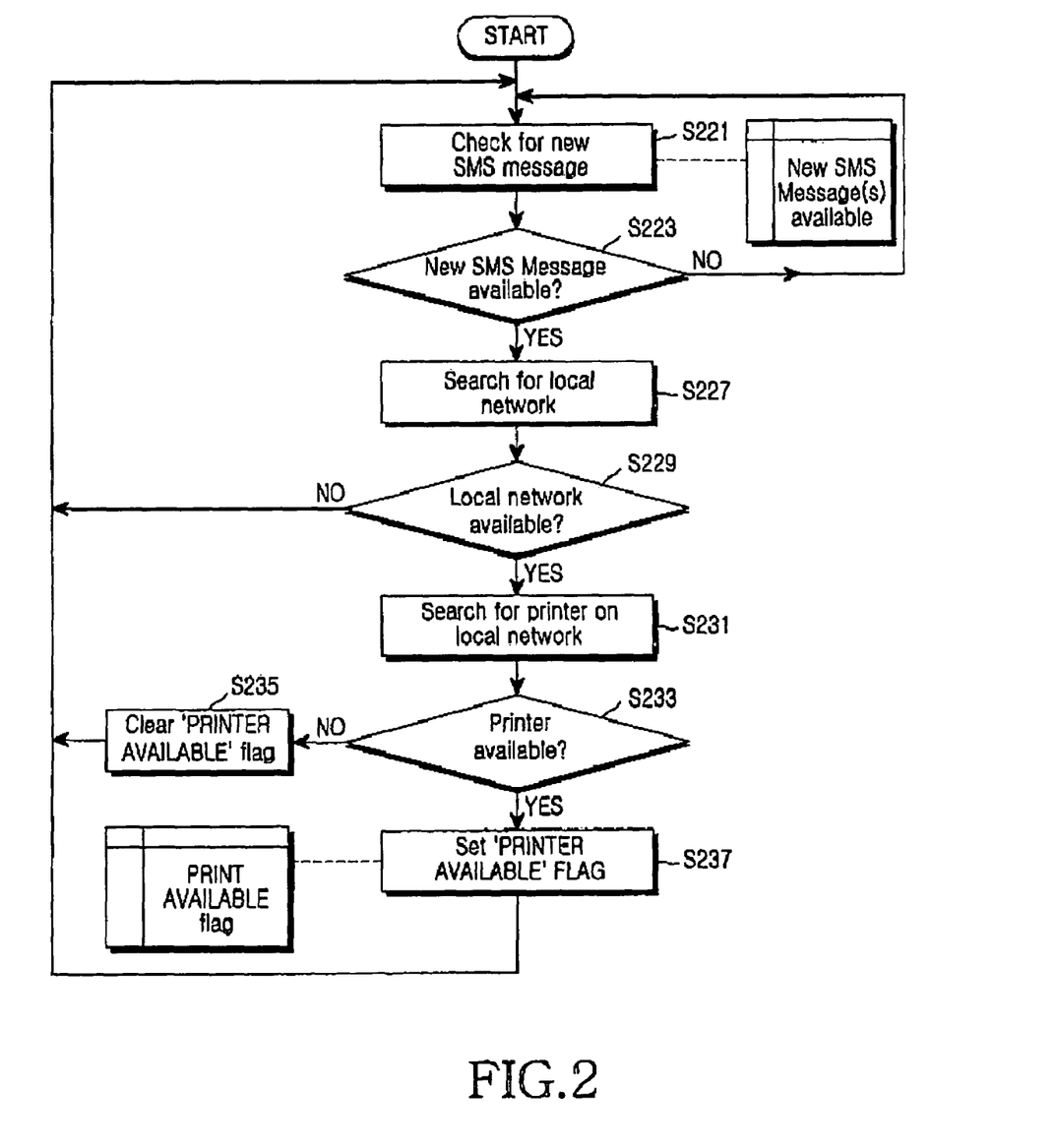
FIG. 2 is a flow chart according to a further embodiment of the present invention.

FIG. 2 is a flow chart illustrating the specific steps required to connect a mobile telephone with a printer in this embodiment.

At step S221 a check is made to see if any new SMS messages have been received by the mobile telephone. If no new SMS messages are received, then the process is looped back to the start to continuously check for any new messages. However, if it was determined that a new SMS message has been received at step S223, then a search for a local wireless network is carried out at step S227. If a local network is available at step S229 then a search is carried out for a printer on the local network at step S231.

If a printer is available at step S233 then a "printer available" flag is set at step S237. However, if a printer is not available at step S233 then a "printer available" flag is cleared at step S235. If the "printer available" flag is set, then a menu option is provided in the user interface on the mobile telephone for the user to select "print", for example, when the message is read. This option is only available to the user if a printer is available on the network. As the search for the printer is run concurrently while the user is looking at the incoming message the option will usually be available for selection by the time the user is ready to print and since the search is initiated only when it is predicted that a printer may be required, then battery power is saved in searching for a printer.

The mobile telephone is not within direct range of a printer in this embodiment, and so must look for a suitable local wireless network as discussed above. A communications link must be set up between the mobile telephone and a printer located on the network.

Figure 3:
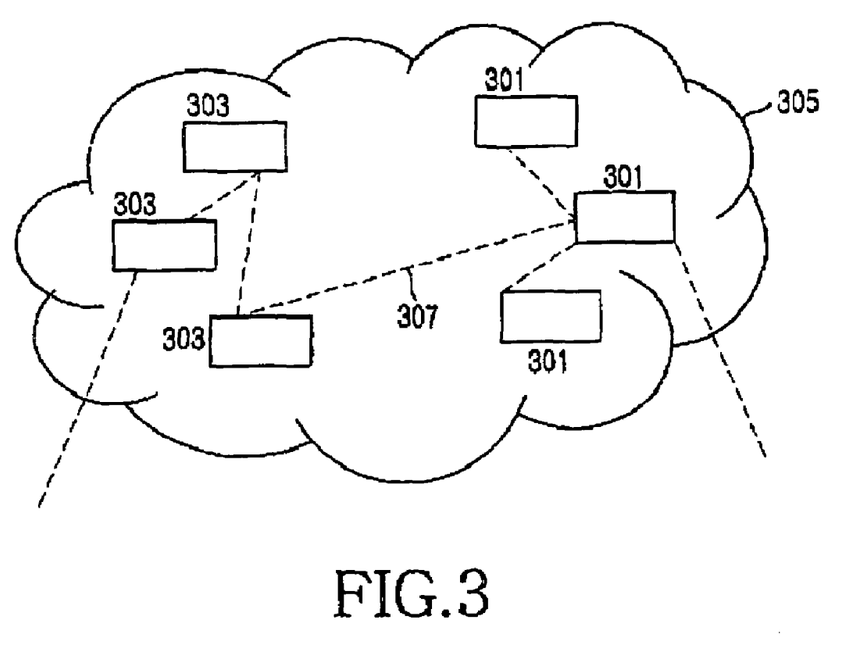
FIG. 3 is a block diagram illustrating a piconet used in an embodiment of the present invention.

In this embodiment the local wireless network is a network such as a Bluetooth piconet depicted in FIG. 3, but may be any other suitable wireless network.

Piconet or personal area networks (PANs) are used as a method of connecting a network of devices in an ad-hoc manner. The connection to the network is able to support up to approximately eight wireless devices. It is then possible to connect in a group, in an independent and non-synchronised manner, up to ten piconets into a scatternet. These networks allow wireless communication devices to be connected on an ad-hoc basis i.e. in a temporary manner with a constantly changing infrastructure and without any one device being in overall control of the network.

Wireless networks enable devices to be interconnected without the need for adding infrastructure such as twisted-wire pair cables throughout an area. The total range of wireless networks can be vast, even though each device has a limited transmission or reception range. This is due to the nodal format of the networks, where each node or device can be used as a junction allowing data to be transmitted from or to a node, or allowing data to merely pass through a node.

Referring to FIG. 3, wireless devices 301 are shown connected to peripheral devices 303 via wireless communication links 307. Due to different conditions around each device the duration and distance of possible communication links varies. Each of the devices, both the wireless communication devices and the peripheral devices are considered as nodes within the ad-hoc network. Each node within the network may be a mobile router, a data source or a data destination, or any combination thereof. Therefore, for data to be transmitted from a first node to a second node, a route needs to be determined. The route may pass through any number of other nodes. These will vary, of course, as devices move, and as they leave and join the local network.

Figure 4:
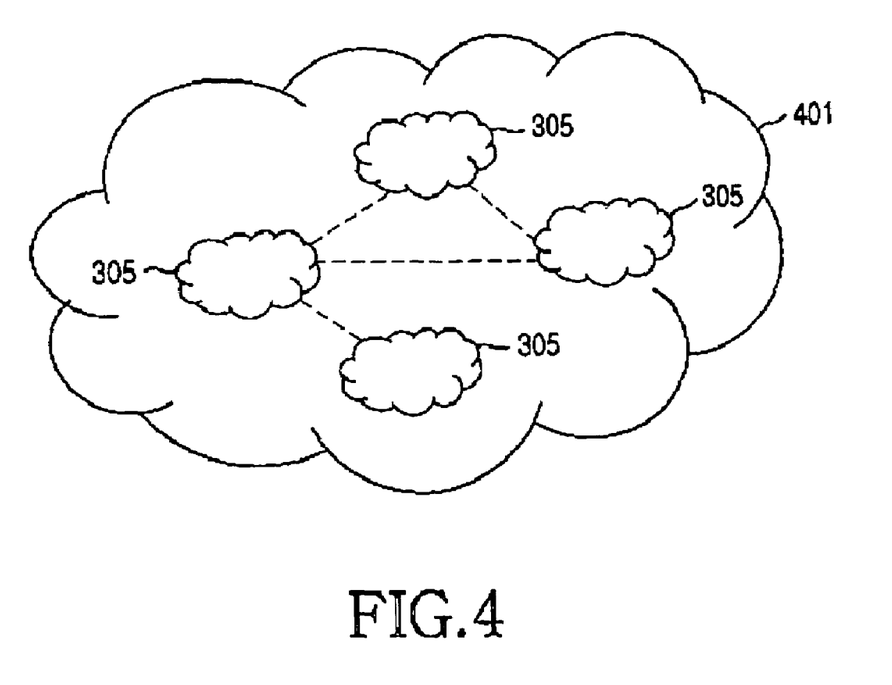
FIG. 4 is a block diagram illustrating a scatternet used in an embodiment of the present invention.

An example of a scatternet as used in Bluetooth technology 401 is shown in FIG. 4. A scatternet incorporates several piconets 305 discussed above.

In the ad-hoc network when the wireless communication device, such as a mobile telephone, wishes to connect with a peripheral device, such as a printer, the mobile telephone first has to locate the network, and then locate the printer on the network. Finally, the mobile telephone must find a route to the printer via nodes in the network so as to connect the two devices via the route found.

If the local network is a Bluetooth network, the Bluetooth device will start a detection process to find other suitable devices in the area by transmitting an inquiry packet. Any devices within the range of the system, usually about 10 meters, will then respond and reveal their presence by sending a message containing their unique address back to the device sending the inquiry packet. The message will also include information on available services for use. This information may also include details concerning how to connect to the device.

The Bluetooth standard operates in the 2.4 GHz band and uses a frequency-hopping scheme as is well known within the art.

Figure 6:
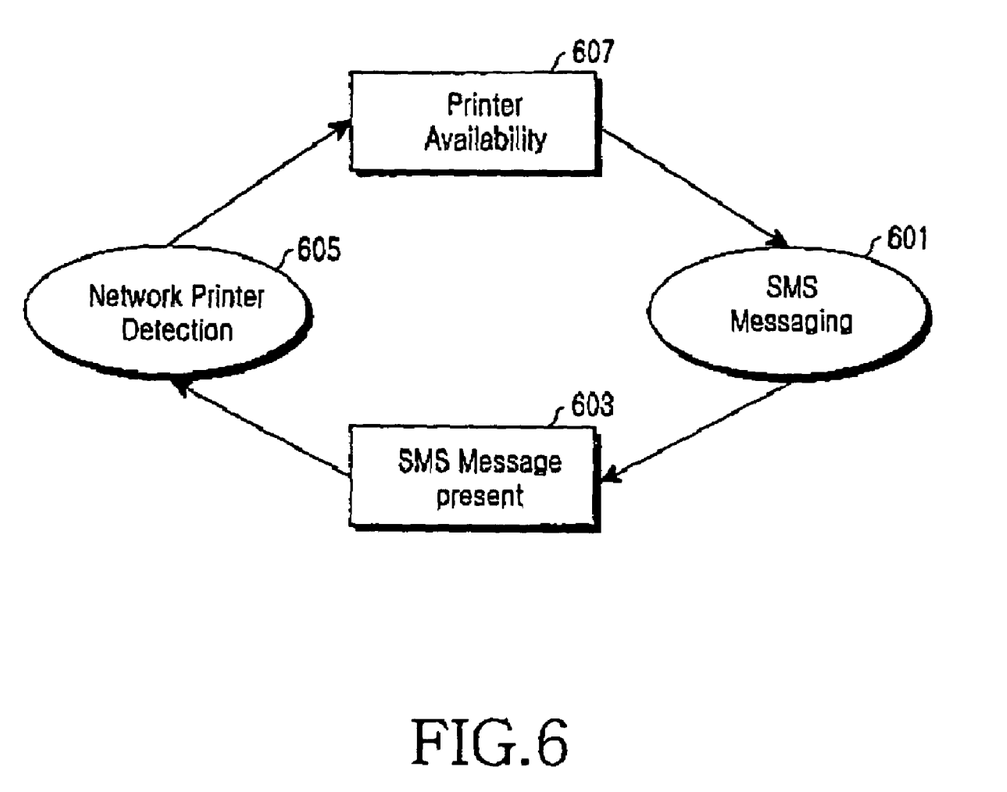
FIG. 6 is a block diagram illustrating a data flow diagram according to an embodiment of the present invention.

FIG. 6 is a block diagram illustrating a data flow indicating the two processes that are carried out; a network printer detection process and an SMS messaging process. The two processes communicate by means of semaphores, flags or global variables, as is well known within the art. The printer detection method maybe by means of the NDIS protocol, the Bluetooth service discovery profile, or some other suitable methods as are well known within the art. The following is a detailed description for the network printer detection process and the SMS messaging process in accordance with FIG. 6. A wireless communication device checks firstly whether a received SMS exists or not (601). When checked that the SMS exists, it is detected that there is a network printer (605) and then, it is checked that the detected network printer is available. If the network printer is available (607) then processing as to the corresponding SMS is performed (601), for example output, and so on. The above steps 60/1, 603, 605 and 607 are repeatedly performed. As the devices connected to the local wireless network are so fluid in terms of being easily removed from and moved around the network, it is preferable that a search for a peripheral device, such as a printer, is carried out as near to the time it is required as possible, whilst also trying to reduce the amount of time the user is aware that they are waiting for a search to be completed.

Once the communications link between the mobile telephone and the printer has been set up, the printer is able to print the SMS received by the mobile telephone upon the user's request. The action of searching for a printer immediately upon receipt of the SMS provides the advantage of utilising the battery to search for a printer at the point when it is predicted that a printer may be required.

It is well known in the art how to connect to and maintain connections with ad-hoc networks. Examples of such methods can be found in the following documents, which are incorporated herein by reference; Routing in Ad-hoc Networks of Mobile Hosts by David B. Johnson, Proceedings of the IEEE Workshop on mobile computing systems and applications, December 1994; Global State Routing: A New Routing Scheme for Ad-hoc Wireless Networks, Tsu-Wei Chen et al, Computer Science Department, University of California, Los Angeles, www.cs.ucla.edu; A Novel Distributed Routing Protocol to Support Ad-hoc Mobile Computing, Chai-Keong Toh, IEEE 15$^{th}$ Annual International Phoenix Conf. Comp. And Commun., March 1996.

A further embodiment of the present invention is discussed below.

A digital camera capable of taking photographs and storing these images within a digital format requires the user to normally download the stored pictures onto a computing device so he can print the photographs using an attached printer. Alternatively, the camera can directly download the pictures to a printing device.

Figure 7:
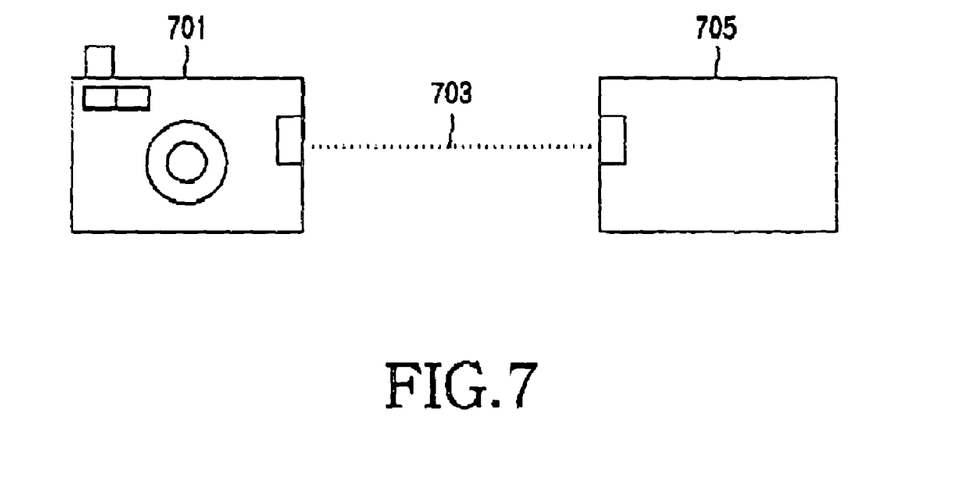
FIG. 7 is a block diagram illustrating a wireless communication device according to an embodiment of the present invention.

A system of the present embodiment, as shown in FIG. 7, has a digital camera 701, which has a wireless communication system such as an infrared or RF communication system, e.g. a Bluetooth system, discussed above. Communication link 703, using for example Bluetooth, is used to connect to a printing device 705.

A control system within the camera 701 determines when a photograph has been taken, and at that time initiates a search for a peripheral device, such as a printer 705, or a local wireless network within communication distance of the camera. If a local wireless network is subsequently found, a search is then carried out to find a suitable printing device, such as a printer on that network. Authorization and identification techniques can be used as discussed in the previous embodiment to ensure security and privacy issues are not breached.

After the user has taken the photograph and is looking through the collection of photographs on the digital camera, an option is provided to the user to print the photograph on a printer 705 within the local wireless network, if such a printing device has been found, either via a local wireless network or within direct transmission range. This provides the same advantages as discussed above regarding the battery usage of the wireless communication device and the time required in finding a suitable peripheral device.

Discussed below is a further embodiment of the present invention.

It is commonly known within the industry that it is necessary to make suitable backup copies of any data stored on a computing device. It is necessary for these backups to be carried out at regular intervals.

Figure 8:
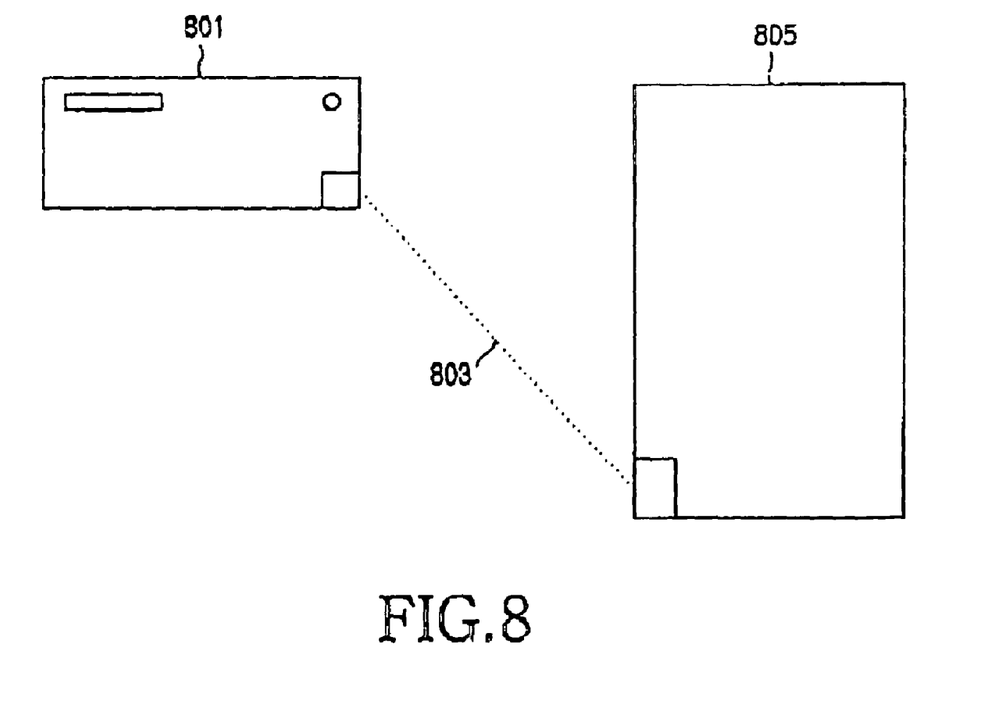
FIG. 8 is a block diagram illustrating a wireless communication device according to a further embodiment of the present invention.

FIG. 8 shows a further embodiment of the present invention, wherein a computing device 801 is connected via a wireless communication link 803 to a backup device 805. The present invention may be used to determine when a computer 801 may require a backup procedure to be executed and then to subsequently locate a suitable device 805 in the vicinity or located on a local wireless network to carry out the backup procedure. For example, the search for a backup device 805 may be implemented during the shut down procedure of a computer 801, or alternatively, if a certain file size has been exceeded a process may be instigated as discussed below.

When it is predicted that the computer 801 requires a backup such as a file size has exceeded a preset limit, a local wireless communications system attached to the computer will subsequently search for a backup device (peripheral device) on a local wireless network; the backup device 805 may be any type of backup device such as a backup disk or backup tapes. If a suitable backup device 805 is found, an option is given to the user to utilize this device so that a suitable backup may be made of the data on the computing device.

The computing device may be of any standard type such as for example, a Pentium®III 450 MHz PC, or alternatively the device may be any laptop, notepad, tablet, desktop or floor-standing device and may run any operating system such as UNIX®, Windows, MacOS or Pocket PC provided these devices have a wireless communication system capability as previously discussed.

This embodiment utilizes time more efficiently by searching for a backup device when the system predicts a backup may be required so that when the user requests the backup to commence, a search for a suitable backup device has already started.

It will be clear to the skilled reader that various modifications and variations may be employed in relation to the above-described embodiments without departing from the scope of the present invention.

It will be clear to the skilled person that any embodiments described wherein the connections between the wireless communication device and the peripheral device are via a local wireless network, that the wireless connection between the devices may be direct and not pass through any other nodes. It will also be clear that any embodiments described wherein the wireless connections are direct that the connections may also be made via other nodes.

It will be clear to the skilled person that it may be necessary when communicating with devices via a wireless medium that suitable authorization maybe required between the devices transferring data. For example, when backing up data to a suitable device, it may be a requirement that the backup device is secure from external influences and that it is possible to obtain the backup when required, particularly if the data is of a sensitive or commercial nature. Also, any printouts made to printers on a network would only be allowed to proceed if the printer is identified by the system, so that the user is aware of where the printout is occurring.

It will be clear to the skilled person that any number of wireless communication devices may be used in the present invention to detect a peripheral device when required. A wireless communication device is defined as any device capable of communicating with any other device over a wireless medium, and is no means limited to devices whose main purpose is communication. For example, a wireless communication device may be included in devices such as computer keyboards, computer mice, digital video cameras, any audio visual wireless device, household appliances, car radios, car keys, video recorders, laptop computers, personal digital assistants (PDAs), phone and digital assistant combined (XDAs), security devices such as burglar alarms, utility service meter reading devices, electronic tagging systems, virtual reality systems, robotic systems, medical systems, aviation systems and military systems.

It will also be clear to the skilled person that any type of peripheral device that can communicate over a local wireless network and is intended as a destination for data sent from a data source may be used in the present invention. Examples of such devices are printers, fax machines, photocopiers, backup systems such as disks and tapes, computing devices such as personal computers and laptop computers, mobile phones, audio visual equipment, security systems including burglar alarms, any type of transport such as cars, buses, trains, aeroplanes etc., display monitors, satellite systems, environmental control systems, garage door systems, household appliances, entertainment systems, teaching aids and disabled persons aids.

It will also be clear to the skilled person that in the embodiments using SMS messages that the message does not have to be a new message received by the mobile telephone for the search for a printer to be initiated. For example, a search may be initiated if any message is stored within the "in" or "out" box of the mobile telephone system and the message editor is accessed by the user. Also, due to the numerous features available on mobile telephones and PDAs this invention also relates to accessing or receiving new, or storing old data such as calendar and reminder entries or any other data entry within these devices.

It will also be clear to a skilled person that this invention can be used with e-mail as well as SMS messages, on any device with e-mail capabilities such as personal computers, laptop computers, XDAs and PDAs.

It will also be clear to a skilled person that instead of utilising a printer to print off data files any type of output device could be used, such as a visual display, for example for use during conferences.

It will further be clear to a skilled person that any of the devices used as wireless communication devices may also be used as the peripheral device.

It will be clear to a skilled person that detection of a printer in the local area may be established by protocols, such as Bluetooth Service Discovery, UPnP or NDIS. Communication with and data transmission to the printer may use protocols such as Bluetooth Printer Profile, Bluetooth LAN Profile and Internet Printer Profile (IPP), all of which are well known within the relevant art.

It will further be clear to the skilled person that communication links may be established using alternative infrared communication standards such as IrCOMM, or other alternative communication standards such as IEEE 802.11 WLAN and IEEE 802.15.4.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless communication device, comprising:
   a search means;
   a control means; and
   a detection means,
   wherein the search means searches for a peripheral device when the detection means detects when it is necessary to connect to the peripheral device in relation to a currently utilized function in the wireless communication device before a user request, and the control means determines when it is necessary to connect to the peripheral device in relation to the currently utilized function, sets a flag when it is determined, as a result of a search, that the peripheral device is available, and thereafter awaits a user's selection of a command corresponding to the set flag.

2. The wireless communication device according to claim 1, further comprising a user interface, wherein the user interface provides an option to utilize the peripheral device, only if the peripheral device is found.

3. The wireless communication device according to claim 2, wherein the peripheral device is not utilized merely because the detection means detects a predetermined condition.

4. The wireless communication device according to claim 3, further comprising:
   a locating means; and
   a route determination means,
   wherein the locating means locates a local wireless network and subsequently locates the peripheral device on the network, and the route determination means determines a route through the network from the wireless communication device to the peripheral device.

5. The wireless communication device according to claim 4, wherein the wireless communication device and the peripheral device communicate using one of radio frequency and infrared.

6. The wireless communication device according to claim 5, wherein the radio frequency communication uses Bluetooth technology.

7. The wireless communication device according to claim 5, wherein the communication between the peripheral device and the wireless communication device is on a second network and a first network is used for the wireless communication device to communicate with other wireless communication devices.

8. The wireless communication device according to claim 5, wherein the wireless communication device is one of a mobile telephone, a personal digital assistant, a laptop computer, a digital camera, and a phone and digital assistant combined (XDA).

9. The wireless communication device according to claim 8, wherein the detection that the peripheral device is likely to be utilized occurs when one of a message editor is accessed on the wireless communication device, messages are stored in a memory of the wireless communication device, any current data is stored in the memory of the wireless communication device, a new calendar entry is entered on the wireless communication device, a data file is accessed on the wireless communication device, and a data file's size exceeds a preset limit on the wireless communication device.

10. The wireless communication device according to claim 4, wherein the peripheral device is one of a printer, display device, a data backup device, and a mobile telephone.

11. A method of controlling a wireless communication device, including the steps of:
   searching for a peripheral device upon detecting the necessity to connect to the peripheral device in relation to a currently utilized function in the wireless communication device before a user request;
   setting a flag according to availability of the peripheral device; and
   awaiting a user's selection of a command corresponding to the set flag.

12. The method according to claim 11, wherein the method further comprises the step of:
   providing an option on a user interface of the wireless communication device to utilize the peripheral device, only if the peripheral device is found.

13. The method according to claim 12, wherein the peripheral device is not utilized merely because a predetermined condition has been detected.

14. The method according to claim 13, wherein the search for the peripheral device further comprises the steps of:
   locating a local wireless network;
   locating the peripheral device on the network; and
   determining a route through the network from the wireless communication device to the peripheral device.

15. The method according to claim 11, wherein the wireless communication device and the peripheral device communicate using one of radio frequency and infrared.

16. The method according to claim 15, wherein the communication between the peripheral device and the wireless communication device is on a second network and a first network is used for the wireless communication device to communicate with other wireless communication devices.

17. The method according to claim 15, wherein the wireless communication device is one of a mobile telephone, a personal digital assistant, a laptop computer, a digital camera, and a phone and digital assistant combined (XDA).

18. The method according to claim 17, wherein the detection that the peripheral device is likely to be utilized occurs when one of a message editor is accessed on the wireless communication device, a new message is received by the wireless communication device, messages are stored in a memory of the wireless communication device, any current data is stored in the memory of the wireless communication device, a new calendar entry is entered on the wireless communication device, a data file is accessed on the wireless communication device, and a data file's size exceeds a preset limit on the wireless communication device.

19. The method according to claim 11, wherein the peripheral device is one of a printer, display device, a data backup device, and a mobile telephone.

* * * * *